May 31, 1960  R. L. CARLSTEDT  2,938,410
SEAL ARRANGEMENT
Filed May 31, 1957  4 Sheets-Sheet 1
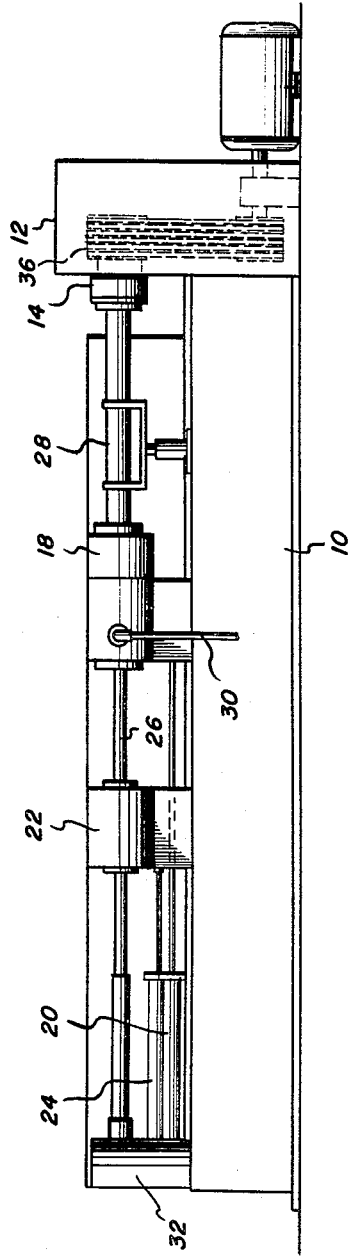
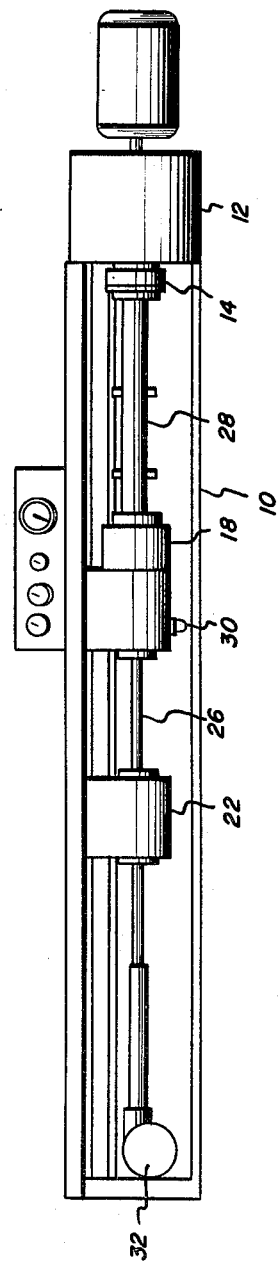
INVENTOR
RAGNAR L. CARLSTEDT
BY Taulmin & Taulmin
ATTORNEYS INVENTOR
RAGNAR L. CARLSTEDT
BY Toulmin & Toulmin
ATTORNEYS

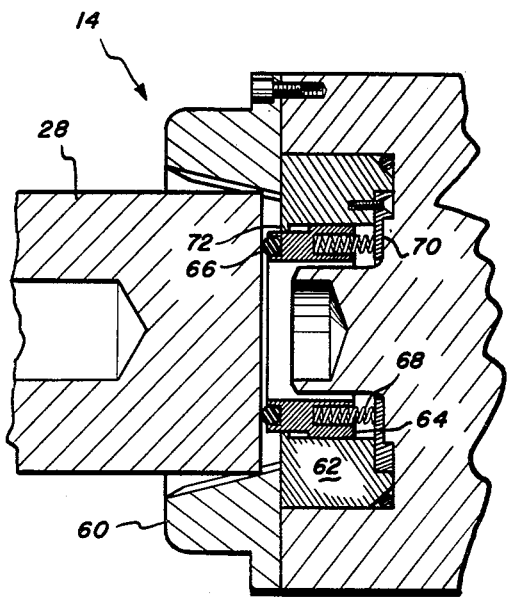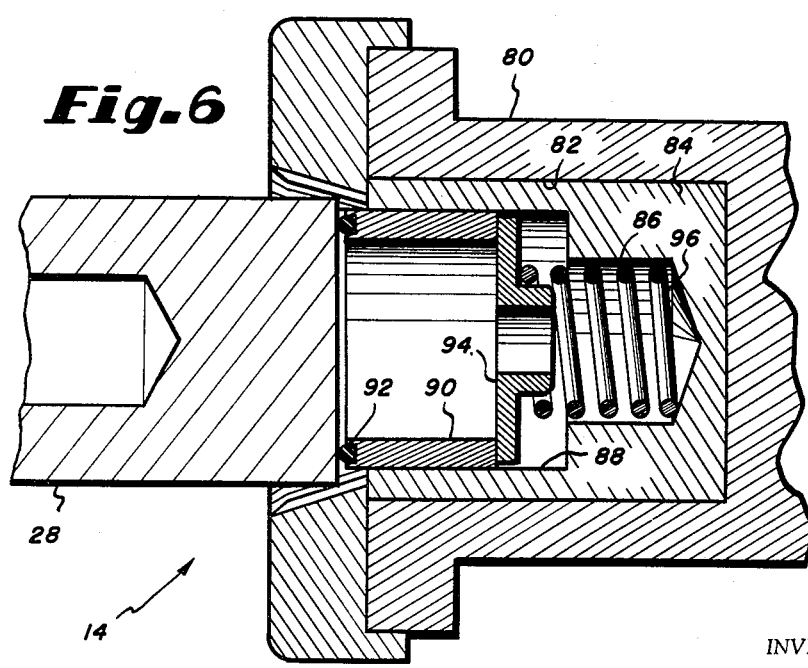

May 31, 1960    R. L. CARLSTEDT    2,938,410
SEAL ARRANGEMENT
Filed May 31, 1957    4 Sheets-Sheet 4
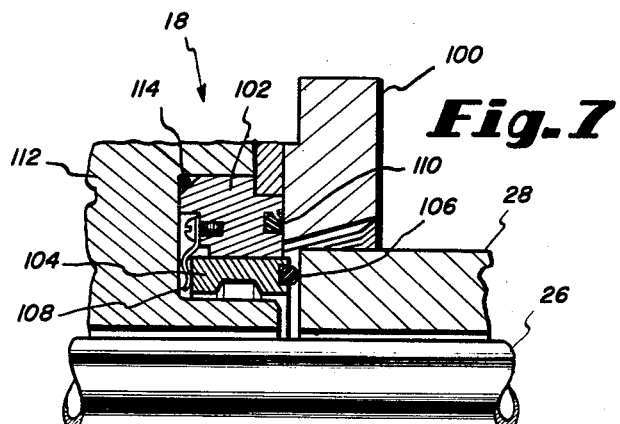
*Fig. 7*
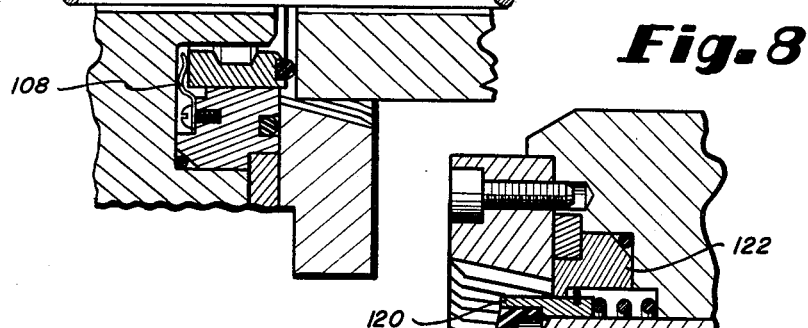
*Fig. 8*
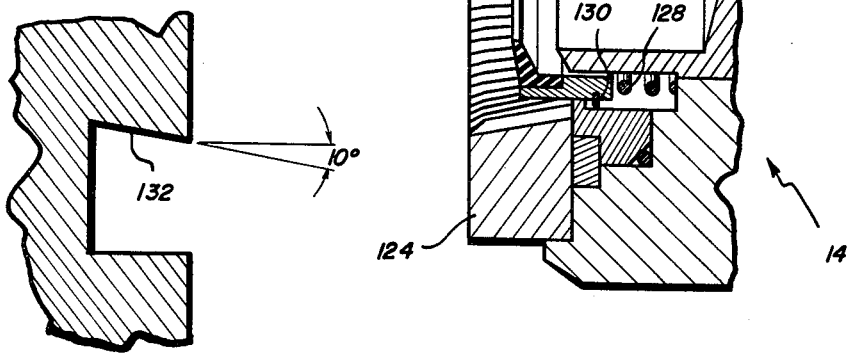
*Fig. 9*
INVENTOR
RAGNAR L. CARLSTEDT
BY  *Toulmin & Toulmin*
ATTORNEYS United States Patent Office 2,938,410
Patented May 31, 1960

2,938,410

SEAL ARRANGEMENT

Ragnar Leonard Carlstedt, Cincinnati, Ohio, assignor to The R. K. Leblond Machine Tool Co., Cincinnati, Ohio, a corporation of Delaware Filed May 31, 1957, Ser. No. 662,857

6 Claims. (Cl. 77—5)

This invention relates to boring machines and in particular to high speed boring machines for boring deep holes in workpieces. More particularly still this invention relates to a boring machine of this nature in which an extremely high coolant pressure is employed for cooling the workpiece and cutting tool and for flushing away the chips taken by the boring tool.

In boring machines of the nature referred to extremely high speed operation is obtained by rotating the workpiece relatively rapidly and pressing a hollow boring bar against the end of the workpiece under relatively high pressure and continuously flushing the chips taken by the boring tool away from the cutting edge thereof by an extremely high pressure coolant. The coolant, for example, may be under a pressure up to 25 atmospheres and is delivered along the outside of the boring bar to the bottom of the hole being bored and then returns through the hollow boring bar to a point of collection where the chips are separated from the coolant and the coolant is then again returned to the pump which develops the aforementioned pressure.

The extremely high pressure lubricant is of importance for maintaining the tool cool during the high speed cutting operation and for rapidly removing the chips and is also used for damping out vibrations of the boring tool since the coolant, in effect, forms an elongated fluid bearing for the boring tool.

With the extremely high pressures utilized, however, there is necessary highly efficient seals at the opposite ends of the workpiece which will be effective for preventing leakage of the cooling fluid. At the boring bar end of the workpiece the seal must be effective through the boring operation, whereas, at the opposite end of the workpiece the seal must become immediately effective when the boring bar breaks through the end of the workpiece and remains effective during the subsequent retracting movement of the boring bar and until the supply of coolant is interrupted.

The particular object of the present invention is the provision of an improved arrangement for effecting the aforementioned seal at the opposite ends of a workpiece being bored in the manner described.

A still further object is the provision of a seal arrangement for a boring machine of the type referred to in which effective sealing at the ends of the workpiece is had but without the seals requiring the use of extremely strong springs as heretofore has been done.

Another object of this invention is the provision of a sealing arrangement for the ends of a workpiece being bored in a boring machine in which the pressure developed on the seal members is sealed against the ends of the workpieces does not detract any substantial amount from the clamping pressure that supports the workpiece between the rotary spindle elements between which it is clamped.

It is a still further object of this invention to provide a seal arrangement of the nature referred to which can readily be replaced at any time without dismantling the machine.

These and other objects and advantages will become more apparent upon reference to the drawings in which:

Figure 1 shows a boring machine of the type for utilizing the present invention in elevation;

Figure 2 is a plan view of the machine;

Figure 5 is a fragmentary sectional view showing a modified seal element of a somewhat modified type;

Figure 6 is a sectional view showing another modified arrangement particularly adapted for use at the spindle end of the workpiece;

Figure 7 is a sectional view showing an arrangement of the seal adapted for use at the boring bar end of the workpiece;

Figure 8 is a view of a modified arrangement in which the O ring that characterized the previously described modifications is replaced by a rubber-like cup that forms the seal; and Figure 9 is a fragmentary view showing the shape of the slot or annular groove in which the O rings of the seal is placed.

Figure 3:
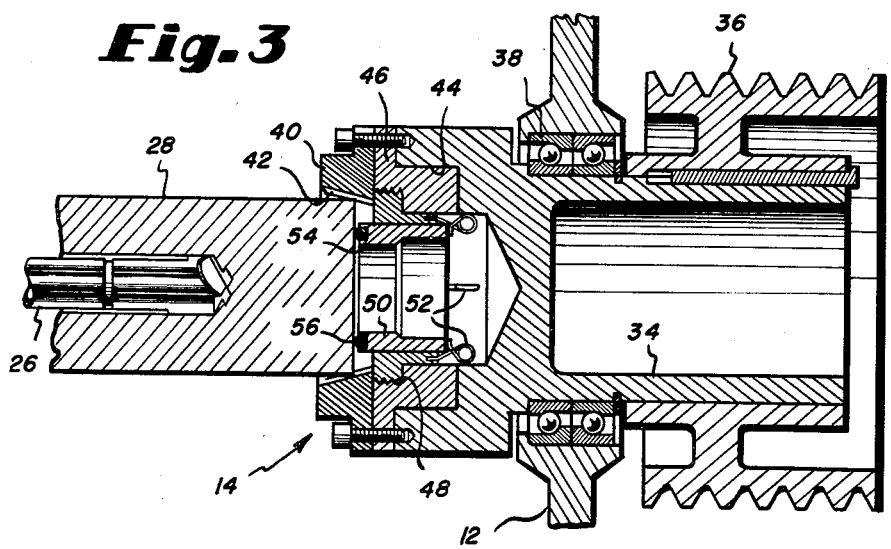
Figure 3 is an enlarged vertical section taken through the spindle end of the machine showing the drive ring that engages the workpiece and the seal arrangement of the present invention.

Referring to the drawings somewhat more in detail, the machine has a rather elongated frame 10 provided at one end thereof with a spindle frame 12 with which is associated a spindle 14 adapted for being driven by belts, chains, or the like, connected with the spindle within the said housing.

The frame also supports a clamp 18 in spaced relation with the spindle but slidable toward and away from the spindle by a fluid motor 20. On the opposite side of the clamp 18 from the spindle is a boring slide 22 adapted for reciprocation on the frame by a fluid motor 24.

The boring slide supports the tubular boring tool 26 which extends sealingly into the back of the clamp 18 on the axis of the workpiece 28 supported between spindle 14 and clamp 18. As mentioned previously there is a supply of coolant under high pressure that is supplied through the clamp via a conduit 30 to the space around the boring bar whence the coolant flows to the end of the boring bar and thence backwardly therethrough to be exhausted through the conduit means 32 leading from the back side of the boring slide 22.

Turning now to Figure 3, it will be seen that the spindle 14 consists of a rotary portion 34 having pulley means or the like at 36 by means of which it is driven in rotation and being supported on bearings 38. The workpiece end of the spindle, which is the end toward the clamp, carries a drive ring 40 which has a serrated, inwardly tapering recess 42 in the center that engages the end of workpiece 28 in driving relation.

The rotary portion 34, forming the main body of the spindle has a bore 44 therein that receives a block 46. Block 46 receives a collar 48 as by the threaded flange at the outer end of the collar and slidably mounted within the collar and closely fitting the collar is the cylindrical seal sleeve 50. The seal sleeve is urged outwardly of the collar toward engagement with the adjacent end of the workpiece by spring means 52 so that the sleeve will bear against the end of the workpiece with a predetermined amount of pressure.

The end of the sleeve adjacent the workpiece is annularly grooved at 54. Mounted in the groove is annular rubber-like O ring 56. It will be apparent at this point that the O ring is so positioned that it engages the workpiece on a diameter smaller than the diameter of sleeve 50 that is exposed to pressure at the opposite end so that any pressure delivered into the sleeve from the workpiece end when the boring tool breaks through the workpiece will not leak between the workpiece and the seal, but instead press the seal tightly against the workpiece and prevent any leakage. At the same time, there is substantially no reduction in the clamping force that holds the workpiece against the drive ring throughout the boring operation.

Figure 4:
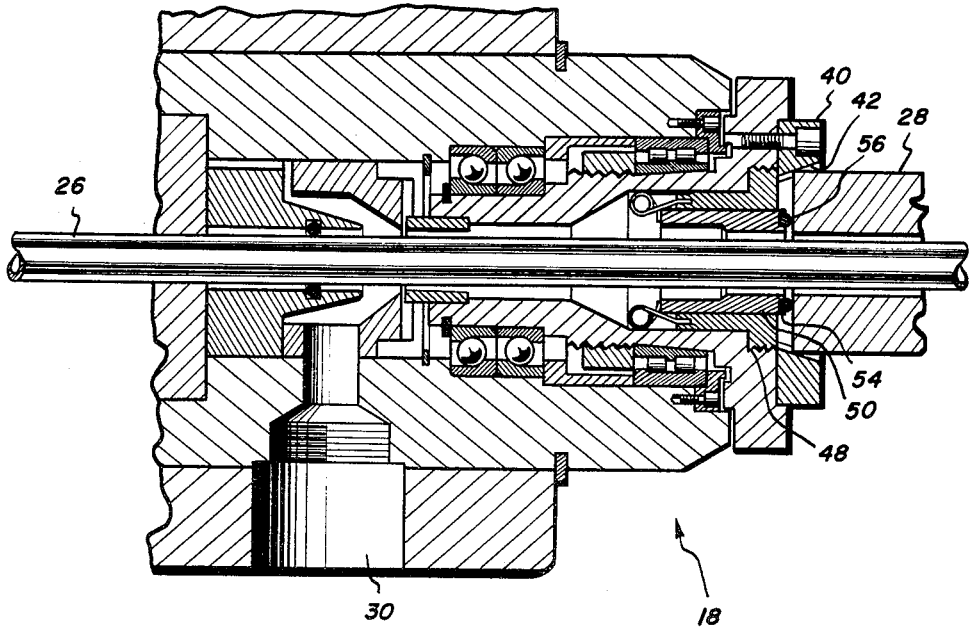
Figure 4 is an enlarged view of the clamp that engages the workpiece at the end opposite the spindle and showing in particular the seal arrangement as it is employed at the end of the workpiece.

The same seal arrangement as described above is employed at the boring bar end of the workpiece as will be seen in Figure 4, and operates in precisely the same manner except in the boring bar end of the workpiece the seal sleeve is continuously subjected to the pressure of the coolant supply rather than merely being subjected thereto after the boring bar breaks through the spindle end of the workpiece. This, however, does not in any way detract from the pressure of the work against the drive plate of the spindle.

The arrangement of Figure 5 is quite similar to the arrangement described above, and may be utilized at either the spindle or the boring bar end of the workpiece. In Figure 5, the clamp plate or drive ring is indicated at 60. Beneath the clamp ring or drive plate 60 is a collar 62 on which is slidably mounted a sleeve 64 forming the seal sleeve. Sleeve 64 carries O ring 66 at its workpiece end in an annular groove and its opposite end has a plurality of holes bored therein for receiving springs 68 to urge the seal sleeve toward the workpiece. An abutment ring 70 is attached to the back of collar 62 and bears on the ends of the springs opposite ring 64.

The collar 62 preferably has a flange at 72 to limit the outward movement of ring 64. It will be apparent that the Figure 5 arrangement is quire similar to the one described in that any pressure supplied to the inside of the seal sleeve when it is in engagement with a workpiece will develop a greater thrust on the sleeve toward the workpiece than away from the workpiece, and because of this substantially positive sealing at the ends of the workpiece will be had and with their being no detraction from the force with which the workpiece is thrust against the spindle drive plate until after the boring bar has broken through the end of the workpiece.

The Figure 6 structure, and which illustrates a seal arrangement for the spindle end of a boring machine is similar to the previously described arrangements except that in Figure 6 the rotary portion 80 of the spindle is bored at 82 to receive a block or collar 84 having a spring bore 86 therein that is counter-bored at 88 to receive sealing sleeve 90 that has an O ring at 92 in a groove on the workpiece end thereof.

A spring bearing plate 94 abuts the right end of sleeve 90 and between the said plate and the bottom of the bore 86 there bears the spring 96. It will be apparent that the Figure 6 arrangement is substantially identical with those previously described, but is particularly adapted for use at the spindle end of the machine where the boring bar does not have to extend completely through the seal.

The Figure 7 structure is a modification useful at either end of the machine, and in this view there is illustrated a clamp ring or drive plate 100 behind which is collar 102 in which is slidably mounted seal sleeve 104. Seal sleeve 104 carries O ring 106 at its outer end, and at its inner end is engaged by the spring clips 108 fastened to the back of collar 102. Collar 102 is preferably sealed to the back of drive plate or ring 100 by O ring 110 and to the body part 112 of the spindle or clamp structure by O ring 114. In this manner, the sealing arrangement is made particularly useful for the boring bar end of the boring machine while at the same time substantially the same structure could be utilized at the spindle end of the machine.

In the Figure 7 arrangement the O ring 106 is not backed up by the outside shoulder on seal sleeve 104, but inasmuch as the O ring is closely confined between the end of the workpiece and the clamp ring or drive plate and the seal sleeve, the same effect is obtained of developing more thrust on the seal sleeve toward the workpiece than is developed thereon away from the workpiece by the high pressure coolant supplied.

In Figure 8 there is shown an arrangement wherein there is a sleeve 120 mounted within a collar 122 at the clamp or spindle end of the workpiece, said collar 122 being confined behind drive plate 124. The seal in the case of the Figure 8 modification is obtained by a resilient rubber-like cup 126 mounted in sleeve 120 and extending inwardly thereof so as to engage the end of a workpiece placed against the plate.

Spring means at 128 may be utilized to provide the initial bias of sleeve 120 toward the workpiece, and the snap ring means 130 may be utilized to limit the outward movement of the sleeve 120 when the workpiece is removed.

The slot in which the O ring is mounted is illustrated in Figure 9 at somewhat enlarged scale and wherein it will be seen that the outer wall of the slot is preferably inclined somewhat inwardly, say about 10 degrees, as at 132, so that the O ring will not readily drop therefrom when the workpiece is removed.

All of the several modifications described above are characterized in providing adequate seals at the ends of the workpiece without exerting any extremely high spring forces against the seal sleeves. The sealing force is principally developed by the high pressure coolant in all of the seals and are readily replaceable, and all except the Figure 8 modification are characterized in utilizing a resilient rubber-like O ring on the ends of the seals arranged so as to be readily removable therefrom for replacement without any dismantling of the machine whatsoever.

All of the seal arrangements are so constructed that they can readily be assembled with the spindle or clamp elements without requiring detailed assembly work at the time that the seals are placed in the machine.

Only simple bores and recesses are required for receiving the seals, and this greatly simplifies the assembling and servicing of the machines as well as reducing the initial cost thereof.

It will be understood that this invention is susceptible to modification in order to adapt it to different usages and conditions; and, accordingly, it is desired to comprehend such modifications within this invention as may fall within the scope of the appended claims.

I claim:

1. In a boring machine having a rotary spindle, a clamp to clamp workpieces against the spindle, and a hollow boring tool movable axially through the clamp to bore the workpiece; means for supplying a coolant fluid under high pressure through the clamp along the outside of the boring tool, and means for sealing against leakage of the coolant fluid at opposite ends of the workpiece comprising substantially cylindrical sealing members slidably mounted in the spindle and clamp, an annular sealing element on the workpiece end of each sealing member, a plurality of spring clip means disposed about the periphery of said sealing members and lightly biasing the members toward the workpiece, and each said sealing element being of smaller diameter than its pertaining sealing member whereby each said member has an unbalanced area of substantial size at the end opposite the workpiece adapted to be acted on by the coolant fluid for urging the members into sealing engagement with the ends of the workpiece.

2. In a boring machine; a rotary spindle, means to clamp a workpiece against the spindle for being driven thereby, means to bore the workpiece from the end opposite the spindle, means for supplying fluid coolant under high pressure to the bore, and means for preventing escape of coolant from between the spindle and workpiece when the bore opens through the spindle end of the workpiece comprising a recess in the workpiece end of the spindle having a closed bottom, a sleeve reciprocably mounted in the recess, a resilient annular seal element on the workpiece end of the sleeve of smaller diameter than the sleeve, a plurality of spring clip means disposed about the periphery of said sleeve and lightly urging the sleeve toward the workpiece, and said seal element leaving an unbalanced fluid operable area of substantial size on the sleeve at the end of the sleeve opposite the seal element arranged to be acted on by coolant for urging the sleeve against the workpiece in sealing relation therewith.

3. In a boring machine; a support means engaging opposite ends of a workpiece to support the workpiece for rotation, means for boring the workpiece on the axis of rotation thereof from one end, and means sealing between the support means and the workpiece comprising a cylindrical sleeve reciprocably mounted in each support means and a plurality of spring clip means disposed about the periphery of said sleeve lightly urging said sleeve into engagement with the workpiece, a resilient annular seal element on each sleeve engaging the workpiece of smaller diameter than the sleeve, and the size of the seal elements leaving on each sleeve an unbalanced fluid operable area of substantial size so disposed and arranged that coolant under pressure delivered to the sleeve will urge the sleeve toward the workpiece whereby each sleeve is pressed against the workpiece with a thrust generally proportional to the pressure of the coolant therein.

4. In a boring machine; support means engaging opposite ends of a workpiece to support the workpiece for rotation, means for boring the workpiece on the axis of rotation thereof from one end, and means sealing between the support means and the work piece comprising a cylindrical sleeve reciprocably mounted in each support means and a plurality of spring clip means disposed about the periphery of said sleeve lightly urging said sleeve into engagement with the workpiece, a resilient annular seal element on each sleeve of smaller diameter than the sleeve engaging the workpiece and the size of said seal elements leaving on each sleeve an unbalanced fluid operable area of substantial size so disposed and arranged that coolant under pressure delivered to the sleeve will urge the sleeve toward the workpiece whereby each sleeve is pressed against the workpiece with a thrust generally proportional to the pressure of the coolant therein, said seal elements comprising rubberlike O-rings, and each sleeve having a groove in its workpiece end for receiving the ring.

5. In a boring machine of the nature described; a rotary member adapted for supportingly engaging the end of a workpiece to be bored, and means sealing between the member and the workpiece comprising a cylindrical sleeve reciprocably mounted in the rotary member, a plurality of spring clip means disposed about the periphery of said sleeve urging the sleeve lightly against the workpiece, and a rubberlike seal element in the end of the sleeve of a size such as to seat on the workpiece outwardly from the bore to be made therein but smaller than the diameter of the sleeve, said seal element because of its size leaving an area on the sleeve at the workpiece end exposed to coolant pressure which is substantially smaller than the effective area at the opposite end whereby the sleeve is urged toward the workpiece with a thrust generally proportional to the coolant pressure in the sleeve.

6. In a boring machine of the nature described; a rotary workpiece support having a bore, a collar in the bore, a drive plate on the support extending over the edge of the collar to retain the collar in place in the bore, a cylindrical sleeve reciprocably mounted in the collar, a resilient seal element carried by the sleeve at the workpiece end thereof, and a plurality of spring clip means disposed about the periphery of said sleeve acting between the collar and sleeve urging the sleeve toward a workpiece engaging the drive plate, said seal element being smaller in diameter than the end of the sleeve opposite the workpiece whereby fluid pressure delivered to the sleeve will bias it toward the workpiece end thereof.

References Cited in the file of this patent

UNITED STATES PATENTS

| 2,842,984 | Carlstedt | July 15, 1958 |

FOREIGN PATENTS

| 1,093,314 | France | Nov. 17, 1954 |
| 1,096,352 | France | Jan. 26, 1955 |